United States Patent
Pardo

[11] Patent Number: 5,959,370
[45] Date of Patent: Sep. 28, 1999

[54] DIFFERENTIAL VOLTAGE BATTERY DC POWER SUPPLY

[76] Inventor: Herbert Pardo, 160 Bonaventure Blvd., Apt. 207, Weston, Fla. 33326

[21] Appl. No.: 09/115,500

[22] Filed: Jul. 15, 1998

[51] Int. Cl.$^6$ ........................................ H02J 1/00
[52] U.S. Cl. .............................. 307/77; 320/116; 320/107
[58] Field of Search .................................. 307/64–66, 75, 307/77; 320/116–123, 107, 112; 429/9, 11, 99

[56] References Cited

U.S. PATENT DOCUMENTS

| | | | |
|---|---|---|---|
| 3,707,664 | 12/1972 | Esch | 320/18 |
| 3,930,192 | 12/1975 | Dinkler | 320/15 |
| 4,175,249 | 11/1979 | Gruber | 323/15 |
| 4,315,162 | 2/1982 | Ferguson | 307/66 |
| 4,622,508 | 11/1986 | Matteau et al. | 320/13 |
| 5,313,152 | 5/1994 | Wozniak et al. | 320/6 |
| 5,498,950 | 3/1996 | Ouwerkerk | 320/18 |
| 5,578,876 | 11/1996 | Crampton | 307/80 |
| 5,631,537 | 5/1997 | Armstrong | 320/15 |
| 5,684,385 | 11/1997 | Guyonneau et al. | 320/15 |
| 5,761,058 | 6/1998 | Kanda | 363/60 |

*Primary Examiner*—Jeffrey Gaffin
*Assistant Examiner*—Ed Garlepp
*Attorney, Agent, or Firm*—Law Practice of Scott L. Lampert, P.A.; Scott L. Lampert

[57] ABSTRACT

A differential voltage battery DC power supply for use with an electronic device, such as a computer, comprising a multi-cell battery, a plurality of regulators, at least one filter and a recharging circuit. The battery cells are electrically interconnected serially to produce positive voltages of 0 to positive 12 volts DC and negative voltages of 0 to negative 12 volts DC. The battery includes output terminals having output DC voltages closely corresponding to the input DC voltages required to power the electronic device. The output terminals are electrically interconnected to regulator circuitry, structured to drop the corresponding battery output terminal DC voltages to the input DC voltages required by the electronic device, and filters, structured to remove unwanted transients. The recharging circuit includes an AC voltage input terminal, at least one transformer structured to drop the input AC voltage to AC voltages corresponding to the battery output terminal DC voltages, and a plurality of rectifiers structured to convert the output AC voltages from the transformers to positive and negative DC voltages corresponding to the battery output terminal DC voltages.

11 Claims, 2 Drawing Sheets

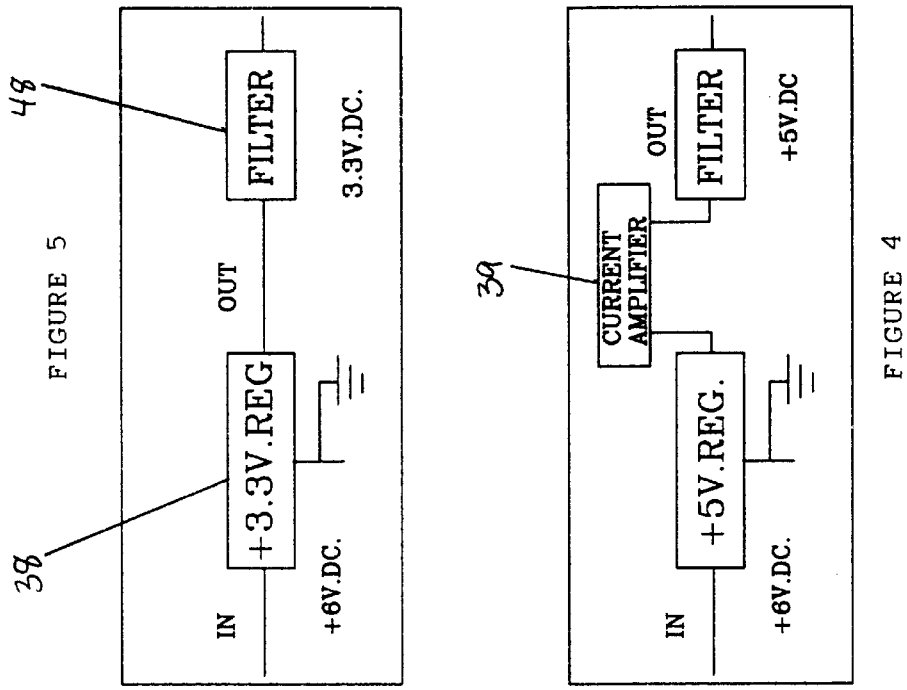
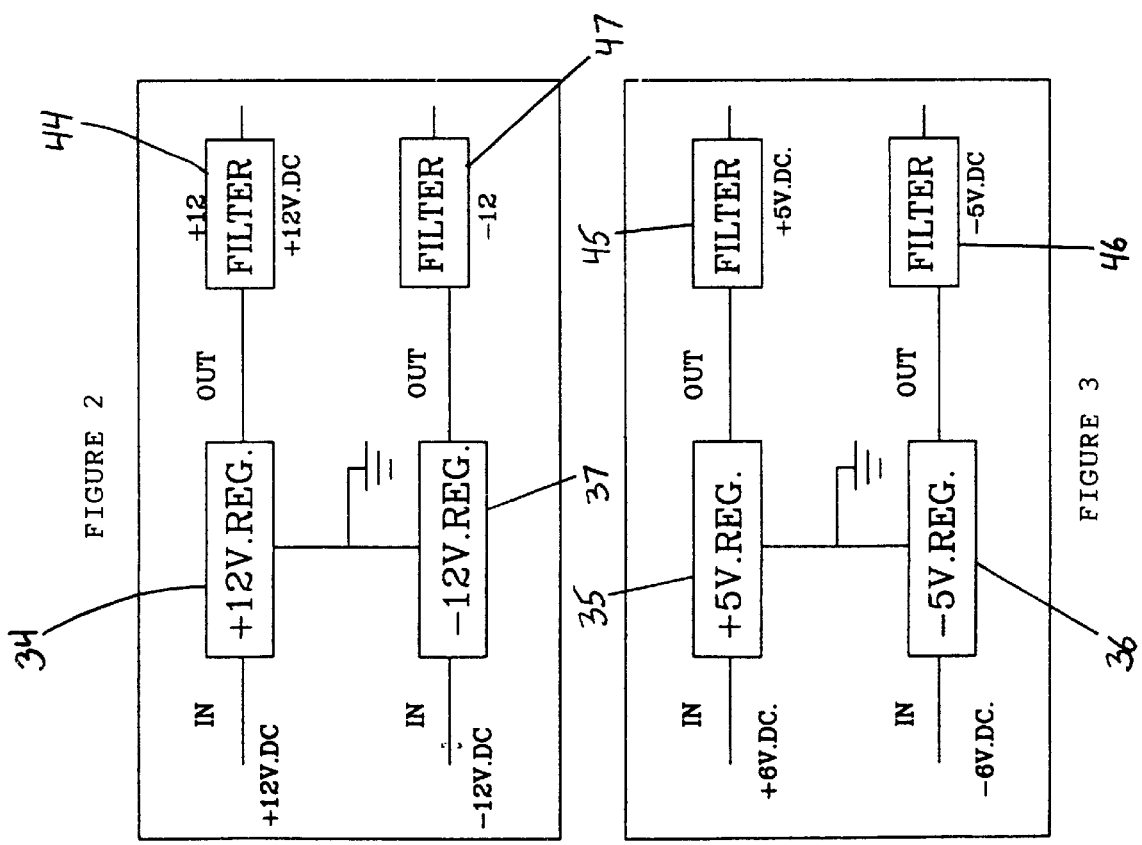

DIFFERENTIAL VOLTAGE BATTERY DC POWER SUPPLY

BACKGROUND OF THE INVENTION

1. Field of the Invention

The present invention relates to power supply devices and, more particularly, to a battery power supply capable of providing differential DC voltages for computer systems and other electronic devices requiring multiple DC voltages.

2. Description of the Related Art

The need for alternative and backup power sources to regular AC power has increased greatly over the last several years. With the proliferation of computers, such alternative power sources have become especially important. As discussed below, applicant has discovered several deficiencies with existing AC power supplies and the backup power supplies currently available today.

Due to evolving technologies and the abundance of features now available in a single electronic device, newer computers, televisions and other electronic systems often require several different, voltages and currents to operate. For instance, motherboards in todays new generation personal computers require positive and negative 12 volts DC, positive and negative 5 volts DC and positive 3.3 volts DC. Larger computers, typically, require even greater voltages and some require three phase voltages. Additionally, several different currents are required by these motherboards. Such voltages and currents are provided by the computer's power supply, which steps down the Input AC voltage to AC voltages equivalent to those required by the motherboard using transformers, converts the AC voltages to the required positive and negative DC voltages using rectifiers, and then regulates the DC voltages and currents through regulator circuitry.

In many instances, such power supplies are generally useful for their intended purposes. However, almost every computer user, at some time or another, has experienced a loss of data due to power interruptions. Such power interruptions gave rise to the current generation of backup power sources, most commonly known as UPS battery backup systems.

UPS systems consist of batteries and circuitry to convert the batteries' DC output voltage to an AC voltage, which is then supplied to the normal computer power supply to replace the unavailable line AC voltage. However, a large amount of amperage is lost during the DC to AC conversion in the UPS and the subsequent AC to DC conversion in the computer power supply, resulting in a loss of efficiency of approximately fifty percent, as well as unwanted transients. As a result of this loss of efficiency, UPS systems, typically, can only operate for between ten and thirty minutes. Consequently, UPS systems are only intended as a short-term power source to give the user sufficient time to save the applications in use and shut down the computer. Line AC power, when available, is still intended to be the primary power source for the electronic equipment, as well as being necessary to recharge the UPS batteries.

Thus, UPS systems are often useful to provide short term backup power to prevent loss of data. However, in many geographical locations, especially in countries in Central and South America, it is not uncommon to have frequent power outages or even no AC power for most of the day. Such long-term loss of AC power essentially renders UPS systems, as well as the regular internal electronic device power supplies, useless, posing substantial problems for those individuals and entities reliant on computers and other electronic devices.

Various other types of backup power sources have been developed over the years. However, virtually all of these prior art devices operate on the same principle as UPS systems, that is, during the presence of AC line power, the regular electronic device AC to DC power supply provides DC power to the computer, and when AC line voltage is absent or low, AC power is provided to the regular computer AC to DC power supply by backup batteries and DC to AC converters. Thus, these other prior art devices include many of the same limitations and problems discussed with respect to UPS systems and, consequently, are only able to operate for short periods of time.

Portable laptop computer batteries are an example of another common alternative power source. Such portable computers have become a mainstay for businessmen and other professionals and provide computer means during a loss of line AC voltage. However, laptop computer power supplies also have certain inherent limitations which limit the batteries to approximately two hours of continuous operation without recharging and which render them inadequate as an alternative power source for todays newer computers and electronic devices. Specifically, laptop computer batteries fail to directly provide the differential DC voltages required by the newer computers and electronic devices. Laptop batteries, typically, only provide a single output voltage, which is converted or stepped down by regulator circuitry in the motherboard to those voltages required to power the computer components.

If the principals underlying laptop computers and their power systems were utilized with todays newer computers, excessive power would be lost and dissipated as heat, thereby requiring fans to maintain the power supply and surrounding computer components at a safe operating temperature. For example, as stated above, motherboards in todays newer personal computers require positive and negative 12 volts DC, positive and negative 5 volts DC and positive 3.3 volts DC. During normal operation, the positive 5 volt line in these motherboards draw as much as 7 amps (during start-up, as much as 10 amps or more may be drawn). Thus, in converting or stepping down the positive 12 volts to positive 5 volts, 49 watts of power (7 volts×7 amps) is wasted and dissipated as heat. Consequently a greater amount of power (49 watts) is wasted in stepping down the positive 5 volts than is actually used by the motherboard on that positive 5 volt line (5 volts×7 amps=35 watts). Such a waste of power is not only inefficient, but creates excessive heat and stress on the computer components, thereby shortening their useful life by causing them to operate at a greater temperature than if less heat were being dissipated.

Moreover, laptop computer batteries, like UPS systems, are intended to be only short-term backup power sources, and not replacements for AC power. Normal AC power, when available, is still intended to be the primary power source for laptop computers and is necessary to recharge its batteries.

Another prior art backup device which operates on similar principals to the laptop computer is shown in U.S. Pat. No. 5,578,876, which discloses a computer power system comprising an AC to DC power supply for providing DC power to the computer during the presence of AC line power and a backup power supply for providing DC power from batteries directly to the DC operated components, bypassing the AC to DC power supply, when AC line voltage is absent or low. Although improving over the prior art devices by eliminating the DC to AC conversion circuitry in the backup power supply, this device still does not recognize the loss of power and heat associated with the normal power supply regulator circuitry and, consequently, includes some of the inherent design deficiencies of the prior art power supplies. For instance, in providing DC power from the batteries directly to the DC operated components, regulator circuitry is used to convert or step down the voltage from positive and negative 12 volts to the required positive and negative voltages. As discussed above, if used with todays newer computers, in so doing, 49 watts of power (7 volts×7 amps) would be wasted and dissipated as heat when providing positive 5 volts.

Furthermore, this prior art device was designed for use with older computer systems in which the motherboards utilize mechanical switches to power up and power down the computer. On newer computer systems, the motherboard utilizes TTL based logic circuitry to communicate with the power supply to step down on power off and to power on. Because it was designed for motherboards having mechanical switches, this prior art device is incapable of operating with these newer computer motherboards.

Thus, the prior art backup devices teach the use of the regular electronic device AC to DC power supply during the presence of AC line power and single voltage output batteries with regulator circuitry or batteries and circuitry to convert the batteries DC voltages to an AC voltage for use with the regular AC to DC power supply when AC line voltage is absent or low. However, applicant has discovered that a battery DC power supply which provides differential DC voltages directly from the batteries to the electronic equipment and which may serve as a primary power source in place of AC power supplies, as disclosed herein, eliminates or reduces many of the problems inherent in the prior art power supplies.

The prior art, as evidenced by its generally consistent approach in power supply designs, teaches away from such a power supply and fails to recognize these problems. Consequently, there is no suggestion or motivation for one of ordinary skill in the art to modify any of the prior art devices in the manner disclosed by applicant's invention or in any other manner which might address these problems. Such lack of disclosure, suggestion or teaching in the prior art supports the conclusion that part of applicant's invention is the discovery of the problem, that is, the need for a differential voltage battery DC power supply system capable of reducing the inefficiencies, power loss and heat dissipation associated with the prior art power supply devices.

Accordingly, there is a need for a differential voltage battery DC power supply capable of operation during the presence and absence of AC line voltage, which reduces the inefficiencies, power loss and heat dissipation associated with the prior art power supply devices and which provides differential DC voltages directly from the batteries to the electronic device during the presence and absence of AC line voltage, thereby extending the operating time of the backup battery and the useful life of the electronic equipment's components. Any such device should include or should be capable of operation with the logic circuitry necessary to communicate with todays newer motherboards and other control circuits in computers and other advanced technology electronic devices. The present invention is particularly suited to overcome those problems which remain in the art in a manner not previously known.

SUMMARY OF THE INVENTION

The present invention is directed towards a new and improved differential voltage battery DC power supply comprising a battery, a plurality of regulators, at least one filter and a recharging circuit. The battery includes twelve two volt rechargeable cells tied together in such a manner to produce voltages of between 0 and positive and negative 12 volts DC. The battery further includes output terminals corresponding to positive 12 volts DC, positive 6 volts DC, negative 6 volts DC and negative 12 volts DC. The output terminals are electrically interconnected to regulator circuitry, structured to drop the corresponding battery output terminal DC voltages to the positive 12 volts DC, positive 5 volts DC, positive 3.3 volts DC, negative 5 volts DC and negative 12 volts DC, and filters, structured to remove unwanted transients. The filters are, in turn, electrically interconnected to logic circuitry, which is structured to communicate with the TTL based logic circuitry in the motherboard to step down on power off and to power on. The recharging circuit includes an AC voltage input terminal, at least one transformer structured to drop the input AC voltage to AC voltages corresponding to the battery output terminal DC voltages, i.e., 12 volts and 6 volts, and a plurality of rectifiers structured to convert the output AC voltages from the transformers to positive and negative DC voltages corresponding to the battery output terminal DC voltages., i.e., positive 12 volts DC, positive 6 volts DC, negative 6 volts DC and negative 12 volts DC. The rectifier outputs are electrically interconnected to the corresponding battery output terminals so that the battery simultaneously recharges and supplies the output DC voltages closely approximating those required by the computer motherboard when the AC line voltage is present.

It is an object of the present invention to provide a new and improved power supply which has all the advantages of the prior art devices and none of the disadvantages.

It is another object of the present invention to provide a differential voltage battery DC power supply.

It is also an object of the present invention to provide such a device which is capable of operation during the presence and absence of AC line voltage.

It is a further object of the present invention to provide such a device which does not. convert the batteries DC voltage to AC for use with the regular electronic equipment's AC power supply during the absence of AC line voltage.

It is yet another object of the present invention to provide such a device which may be utilized as the electronic device's primary power source in place of its internal power supply.

It is a yet a further object of the present invention to provide such a device which is capable of operation with the logic circuitry necessary to communicate with todays newer motherboards and other control circuits in computers and other advanced technology electronic devices.

These and other objects and advantages of the present invention will become more readily apparent in the description which follows.

BRIEF DESCRIPTION OF THE DRAWINGS

For a fuller understanding of the nature of the present invention, reference should be had to the following detailed description, taken in connection with the accompanying drawings in which:

FIG. 2 is a block diagram of the positive and negative 12 volt DC regulators and filters.

FIG. 3 is a block diagram of the positive and negative 5 volt DC regulators and filters.

FIG. 4 is a block diagram of the positive 5 volt DC regulator, filter and current amplifier FIG. 5 is a block diagram of the positive 3.3 volt DC regulator and filter.

Like reference numerals refer to like parts throughout the several views of the drawings.

DETAILED DESCRIPTION OF THE PREFERRED EMBODIMENT

Figure 1:
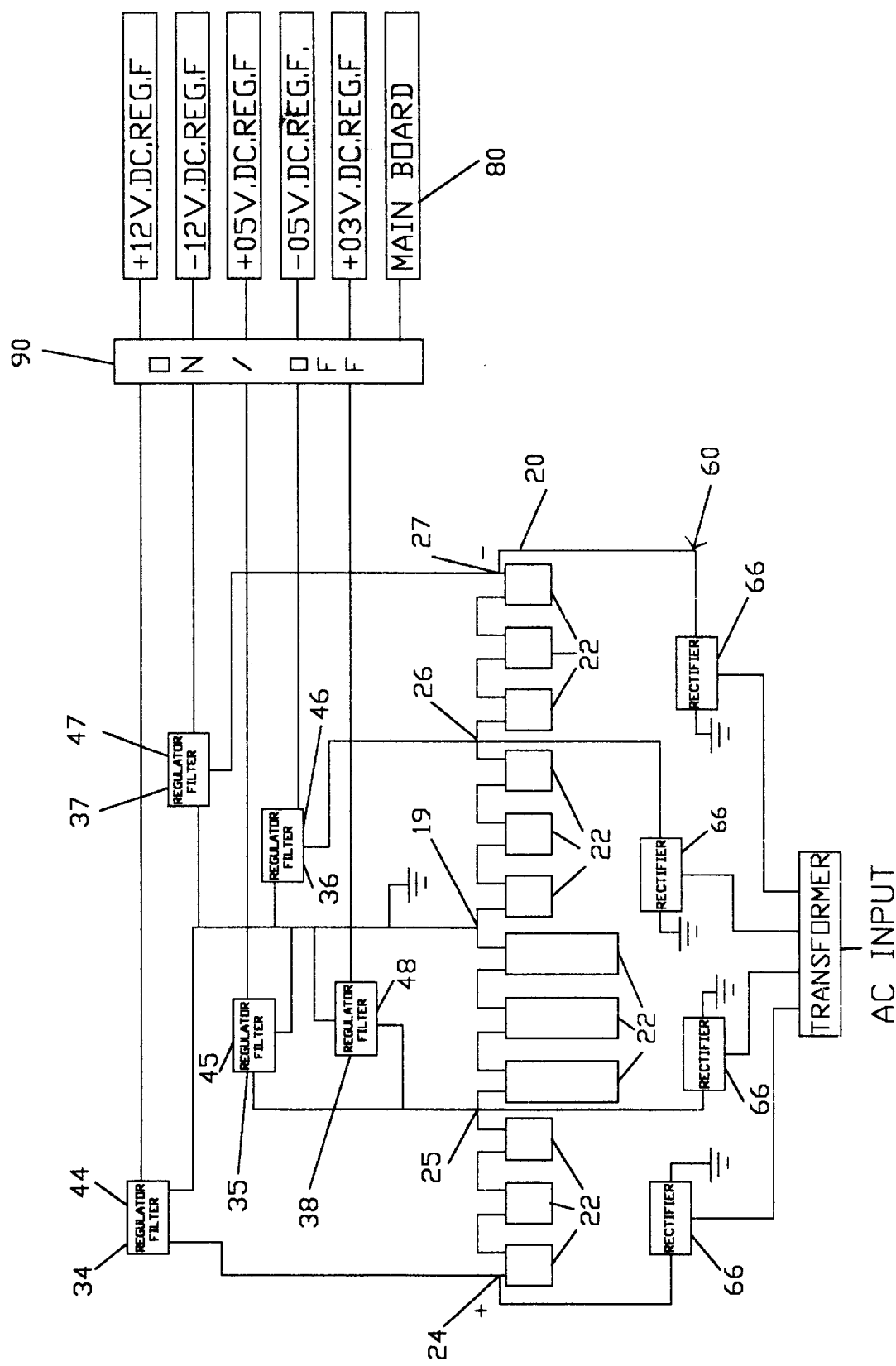
FIG. 1 is a block diagram of the differential voltage battery DC power supply of the present invention.

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

As shown in FIGS. 1–5, the present invention is directed towards a new and improved differential voltage battery DC power supply comprising an electronic device 80, a battery 20, regulators 34,35,36,37,38, filters 44,45,46,47,48, and a recharging circuit 60. The electronic device 80 may be a computer, television or other device having electronic components operable with DC power. The electronic device 80 includes interface circuitry having DC power inputs structured for receiving predetermined input DC voltages and predetermined input currents.

Although the differential voltage battery DC power supply of the present invention may be used with any electronic device 80, the following detailed description will describe the preferred embodiment for use with a personal computer to facilitate understanding of the invention. In computers, a motherboard acts as the interface circuitry and converts the input DC voltages and currents to those required to operate the computer components. The input DC voltages in todays newer generation pentium II personal computers are positive and negative 12 volts DC, positive and negative 5 volts DC and positive 3.3 volts DC. Other computers and electronic devices may require different voltages and some even require three phase voltages.

As shown in FIG. 1, the battery 20 includes twelve two volt rechargeable cells 22 tied together in such a manner to produce voltages of between 0 and positive and negative 12 volts DC. This is accomplished by placing six of the cells 22 on both sides of ground 19. Additional cells 22 may be utilized to accommodate electronic devices requiring DC voltages greater than 12 volts DC. The battery 20 may be of any type comprising rechargeable chemicals and having the amperage necessary to power the desired electronic device. In the preferred embodiment, a lead-acid battery 20 is used.

The battery further includes output terminals 24, 25, 26, 27 corresponding to positive 12 volts DC, positive 6 volts DC, negative 6 volts DC and negative 12 volts DC, respectively. Output terminal 24 is located on the cell of the serially connected positive voltage cells furthest from ground 19 and corresponds to positive 12 volts. Output terminal 25 is located between the third and fourth cells of the positive voltage cells from ground 19 and corresponds to positive 6 volts. Output terminal 26 is located between the third and fourth cells of the serially connected negative voltage cells from ground 19 and corresponds to negative 6 volts. Output terminal 27 is located on the cell of the serially connected negative voltage cells 23 furthest from ground 19 and corresponds to negative 12 volts. For larger computers and other electronic devices requiring different voltages, the number of output terminals and their locations on the battery 20 may vary.

Each of the output terminals 24, 25, 26 and 27 is electrically interconnected to regulator circuitry 34, 35, 36, 37, respectively, structured to drop the corresponding battery output voltages to the input voltages required by the computer motherboard. During charging of the battery 20 cells 22, each of the cell 22 voltages may actually exceed two volts, resulting in output terminal 24 exceeding positive 12 volts DC. Thus, the regulator circuitry 34 electrically interconnected to output terminal 24 is structured to drop the voltage to positive 12 volts DC. Similarly, regulator circuitry 35 electrically interconnected to output terminal 25 is structured to drop the voltage from approximately positive 6 volts DC to positive 5 volts DC, regulator circuitry 36 electrically interconnected to output terminal 26 is structured to drop the voltage from approximately negative 6 volts DC to negative 5 volts DC, and regulator circuitry 37 electrically interconnected to output terminal 27 is structured to drop the voltage to negative 12 volts DC. Output terminal 25 is also electrically interconnected to regulator circuitry 38, which is structured to drop the voltage from approximately 6 volts DC to positive 3.3 volts DC. By extracting those voltages, which closely approximate the voltages required by the computer or other electronic device, directly from the battery 20, the voltage drop required by the regulator circuitry 34, 35, 36, 37, 38 is minimized, thereby minimizing the power wasted and dissipated as heat and improving the power supply efficiency.

The regulator circuitry 34,35, 36, 37 technology is well known in the art. In the preferred embodiment, an LM317 integrated circuit is used to accomplish the necessary regulation. The LM317 is an adjustable regulator designed to provide output voltages ranging from 1.2 volts DC to 37 volts DC. However, any other similar regulator circuitry may, alternatively be used.

During startup and active operation of the newer personal computers, the positive 5 volt line in the motherboard may draw as much as 10 amps. Current amplifier 39 is structured to amplify the current in the positive 5 volt line to meet such demand.

Filters 44, 45, 46, 47, 48 are electrically interconnected to the outputs of the regulator circuitry 34, 35, 36, 37, 38 respectively, to filter out unwanted transients. The outputs of the filters 44, 45, 46, 47, 48 are electrically interconnected to logic circuitry 90, which, in turn, is electrically interconnected to the DC power inputs of the computer motherboard 80. The logic circuitry 90 is structured to communicate with the TTL based logic circuitry in the motherboard 80 to step down on power off and to power on. Logic circuitry 90 capable of performing this function is well known in the art. In the preferred embodiment, logic circuitry 90, which amplifies through mechanical relays to handle up to 40 amps, is current amplifier signal activated through low and high resistance to detect the action of the motherboard 80.

The recharging circuit 60 includes an AC voltage input terminal, at least one transformer and a plurality of rectifiers 66. The primary windings of the transformers are electrically interconnected to the AC voltage input terminal. The transformers are structured to drop the input AC voltage from 110 or 120 volts AC to AC voltages corresponding to battery output terminal 24, 25, 26, 27 output DC voltages, i.e., 12 volts AC and 6 volts AC. The transformers may be selected from the many commercially available today. The number of transformers required is dependent upon the type of transformer selected and the manner with which it is used.

The rectifier 66 inputs are electrically interconnected to the secondary windings of the transformers and are structured to convert the AC voltages to positive and negative DC voltages corresponding to the battery output terminal 24, 25, 26, 27 output DC voltages, i.e., positive 12 volts DC, positive 6 volts DC, negative 6 volts DC and negative 12 volts DC, respectively. The rectifiers 66 are preferably one of the many commercially available top center rectifiers but, alternatively, other types of similar rectifiers, capable of the required AC to DC conversion, may be used. The rectifier outputs are electrically interconnected to the corresponding battery output terminals 24, 25, 26, 27 so that the battery 20 simultaneously recharges and supplies output DC voltages closely approximating those required by the computer motherboard when the AC line voltage is present.

While the invention has been described, disclosed, illustrated and shown in various terms of certain embodiments or modifications, which it has presumed in practice, the scope of the invention is not intended to be, nor should it be deemed to be, limited thereby and such other modifications or embodiments as may be suggested by the teachings herein are particularly reserved, especially as they fall within the breadth and scope of the claims here appended.

What is claimed is:

1. A differential voltage battery DC power supply comprising:

an electronic device operable with DC power, said electronic device comprising a plurality of DC power inputs, each of said plurality of DC power inputs being structured for receiving a predetermined DC input voltage and a predetermined input current;

a battery having a plurality of rechargeable, interconnected cells and a plurality of output terminals tapped from predetermined junctions of said plurality of said interconnected cells, each of said plurality of output terminals corresponding to an output DC voltage;

means for dropping each of said output DC voltages to one of said predetermined DC input voltages, said means for dropping each of said plurality of output DC voltages being electrically interconnected to said plurality of output terminals and said plurality of DC power inputs; and means for recharging said battery while said battery simultaneously provides said output DC voltages.

2. A differential voltage battery DC power supply as recited in claim 1 wherein said means for dropping each of said plurality of output DC voltages comprises a plurality of regulators, each of said plurality of regulators being structured to drop one of said output DC voltages to one of said predetermined DC input voltages.

3. A differential voltage battery DC power supply as recited in claim 1 further comprising a plurality of filters electrically interconnected to said means for dropping each of said plurality of output DC voltages and said plurality of DC power inputs, said plurality of filters being structured to reduce unwanted transients.

4. A differential voltage battery DC power supply as recited in claim 1 wherein said means for recharging said battery comprises means for receiving an input AC voltage, means for dropping said input AC voltage to a plurality of AC voltages corresponding to said plurality of output DC voltages, and means for converting each of said plurality of AC voltages to a positive and negative DC voltage corresponding to said plurality of output DC voltages.

5. A differential voltage battery DC power supply as recited in claim 4 wherein said means for dropping said input AC voltage to a plurality of AC voltages corresponding to said plurality of output DC voltages comprises at least one transformer.

6. A differential voltage battery DC power supply as recited in claim 4 wherein said means for converting each of said plurality of AC voltages to a positive and negative DC voltage corresponding to said plurality of output DC voltages comprises a rectifier.

7. A differential voltage battery DC power supply comprising:

an electronic device operable with DC power, said electronic device comprising a plurality of DC power inputs, each of said plurality of DC power inputs being structured for receiving a predetermined input DC voltage and a predetermined input current;

a battery having a plurality of rechargeable, interconnected cells and a plurality of output terminals tapped from predetermined junctions of said plurality of said interconnected cells, each of said plurality of output terminals corresponding to an output DC voltage;

a plurality of regulators electrically interconnected to said plurality of output terminals, each of said plurality of regulators being structured to drop one of said output DC voltages to one of said predetermined input DC voltages;

a plurality of filters, each of said plurality of filters being electrically interconnected to one of said plurality of regulators and said plurality of DC power inputs, said plurality of filters being structured to reduce unwanted transients; and means for recharging said battery while said battery simultaneously provides said output DC voltages.

8. A differential voltage battery DC power supply as recited in claim 7 wherein said means for recharging said battery comprises means for receiving an input AC voltage, means for dropping said input AC voltage to a plurality of AC voltages corresponding to said plurality of output DC voltages, and means for converting said each of said plurality of AC voltages to a positive and negative DC voltage corresponding to said plurality of output DC voltages.

9. A differential voltage battery DC power supply as recited in claim 8 wherein said means for dropping said input AC voltage to a plurality of AC voltages corresponding to said plurality of output DC voltages comprises at least one transformer.

10. A differential voltage battery DC power supply as recited in claim 8 wherein said means for converting each of said plurality of AC voltages to a positive and negative DC voltage corresponding to said plurality of output DC voltages comprises a rectifier.

11. A differential voltage battery DC power supply comprising:

an electronic device operable with DC power, said electronic device comprising a plurality of DC power inputs, each of said plurality of DC power inputs being structured for receiving a predetermined input DC voltage and a predetermined input current;

a battery having a plurality of rechargeable, interconnected cells and a plurality of output terminals tapped from predetermined junctions of said plurality of said interconnected cells, each of said plurality of output terminals corresponding to an output DC voltage;

a plurality of regulators electrically interconnected to said plurality of output terminals, each of said plurality of regulators being structured to drop one of said output DC voltages to one of said predetermined input DC voltages;

a plurality of filters, each of said plurality of filters being electrically interconnected to one of said plurality of regulators and said plurality of DC power inputs, said plurality of filters being structured to reduce unwanted transients; and means for recharging said battery while said battery simultaneously provides said output DC voltages, said means, for recharging said battery comprising at least one transformer structured to drop an input AC voltage to a plurality of AC voltages corresponding to said plurality of output DC voltages and a plurality of rectifiers, each of said plurality of rectifiers being structured to convert each of said plurality of AC voltages to a positive and negative DC voltage corresponding to said plurality of output DC voltages, whereby said positive and negative DC voltages are electrically interconnected to said battery so that said battery simultaneously recharges and provides said output DC voltages when said input AC voltage is present.

* * * * *